(12) United States Patent
Gamo et al.

(10) Patent No.: US 8,741,419 B2
(45) Date of Patent: Jun. 3, 2014

(54) NANOCARBON MATERIAL-COMPOSITE SUBSTRATE AND MANUFACTURING METHOD THEREOF

(75) Inventors: Hidenori Gamo, Tokyo (JP); Yoshihiro Kodama, Tokyo (JP); Akira Tamura, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 0 days.

(21) Appl. No.: 13/064,507

(22) Filed: Mar. 29, 2011

(65) Prior Publication Data

US 2011/0183105 A1 Jul. 28, 2011

Related U.S. Application Data

(63) Continuation of application No. PCT/JP2009/067061, filed on Sep. 30, 2009.

(30) Foreign Application Priority Data

Sep. 30, 2008 (JP) .................................. 2008-254823

(51) Int. Cl.
  *B32B 3/00* (2006.01)
  *B32B 9/00* (2006.01)
  *B32B 19/00* (2006.01)

(52) U.S. Cl.
  USPC ........... 428/172; 428/156; 428/167; 428/408; 428/689; 428/702

(58) Field of Classification Search
  USPC ......... 428/156, 167, 172, 173, 408, 689, 702; 977/778, 892, 843; 427/249.1
  See application file for complete search history.

(56) References Cited

U.S. PATENT DOCUMENTS

| | | | |
|---|---|---|---|
| 7,022,541 B1 * | 4/2006 | Yenilmez et al. | 438/52 |
| 2002/0178846 A1 * | 12/2002 | Dai et al. | 73/866.5 |
| 2004/0151653 A1 * | 8/2004 | Ando et al. | 423/447.1 |
| 2007/0018552 A1 | 1/2007 | Cho et al. | |

FOREIGN PATENT DOCUMENTS

| | | |
|---|---|---|
| CN | 1520381 | 8/2004 |
| JP | 2002-255519 | 9/2002 |
| JP | 2002-285334 | 10/2002 |
| JP | 2003-012312 | 1/2003 |
| JP | 2003-272517 | 9/2003 |
| JP | 2003297222 A * | 10/2003 |
| JP | 2006-55698 | 3/2006 |
| JP | 2006-143496 | 6/2006 |
| JP | 2006-147801 | 6/2006 |
| JP | 2006213551 A * | 8/2006 |
| JP | 2007-314387 | 12/2007 |

(Continued)

OTHER PUBLICATIONS

International Search Report for PCT/JP2009/067061, mailed Dec. 28, 2009.
Chinese Office Action issued Dec. 20, 2012 for corresponding Chinese Application No. 2009801386611.X.

(Continued)

*Primary Examiner* — Catherine A Simone

(57) ABSTRACT

Disclosed is a nanocarbon material-composite substrate including a substrate, a three-dimensional structural pattern formed on the substrate, and a nanocarbon material formed on a surface of the substrate, wherein the nanocarbon material is disposed at least on side surfaces of the three-dimensional structural pattern.

4 Claims, 6 Drawing Sheets

(56) References Cited

FOREIGN PATENT DOCUMENTS

| | | | |
|---|---|---|---|
| JP | 2007314387 | A * | 12/2007 |
| JP | 2008093494 | A * | 4/2008 |
| JP | 2009-032819 | | 2/2009 |
| WO | 2009/031344 | A1 | 3/2009 |
| WO | 2009/054461 | A1 | 4/2009 |

OTHER PUBLICATIONS

Anyuan Cao, et al., "Direction-Selective and Length-Tunnable In-Plane Growth of Carbon Nanotubes", Advanced Materials, vol. 15, No. 3, Jul. 4, 2003, pp. 1105-1109.

Extended European Search Report mailed Feb. 24, 2014 in corresponding European Application No. 09817825.4.

* cited by examiner

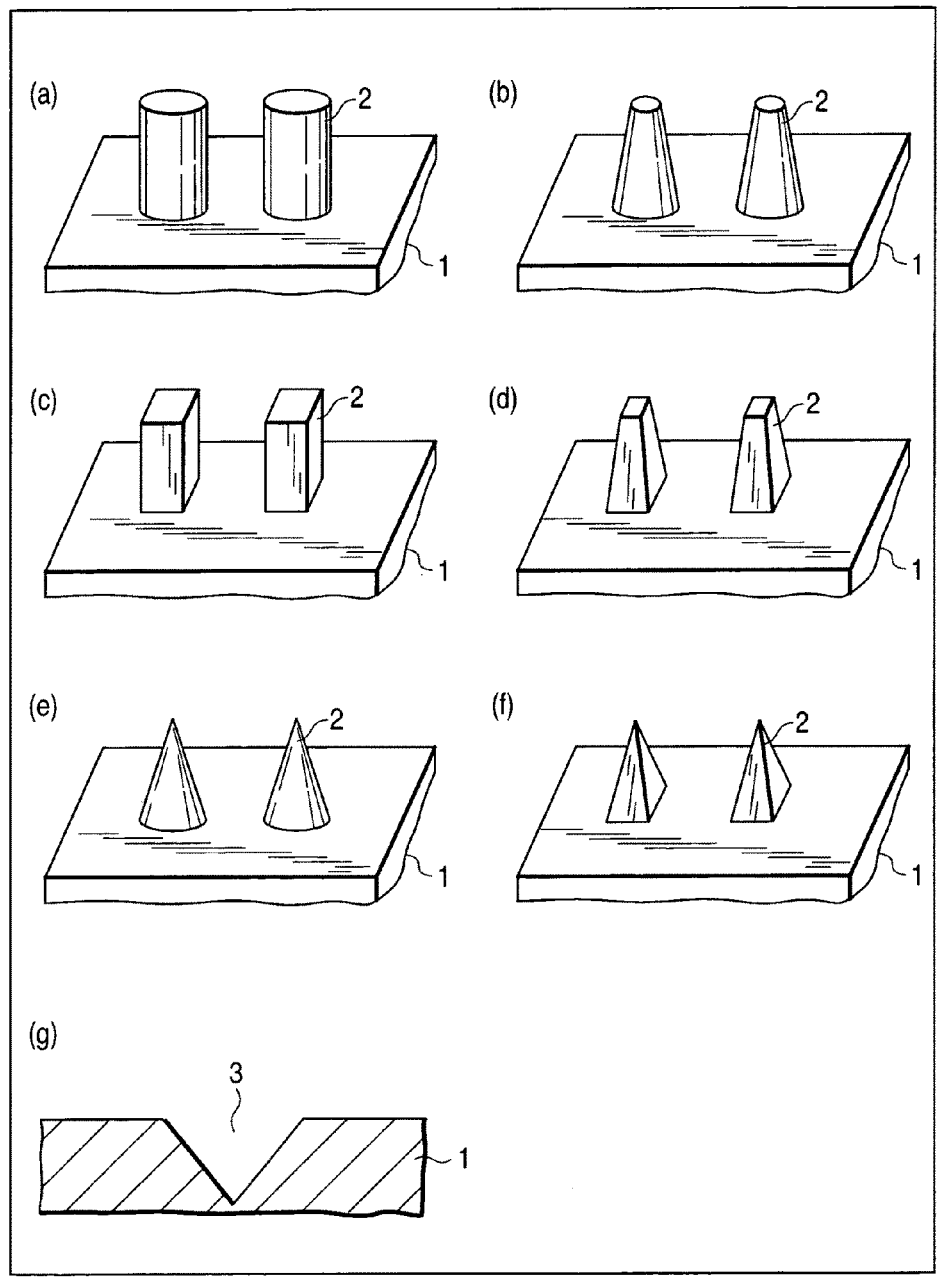
F I G. 2

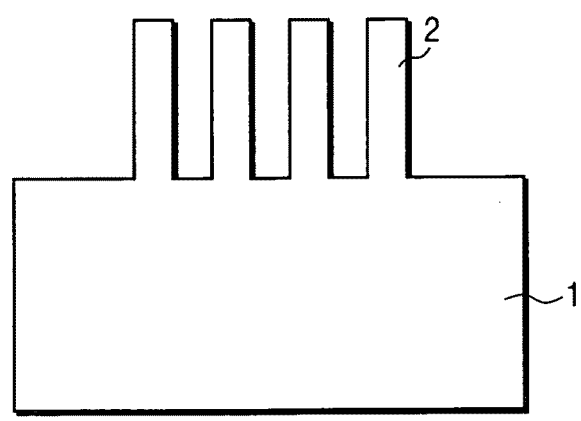
F I G. 3A
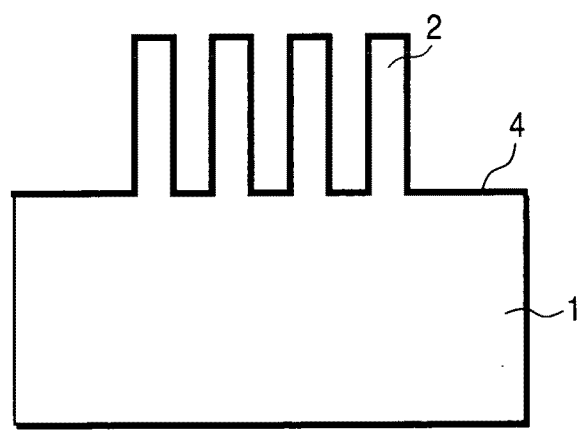
F I G. 3B
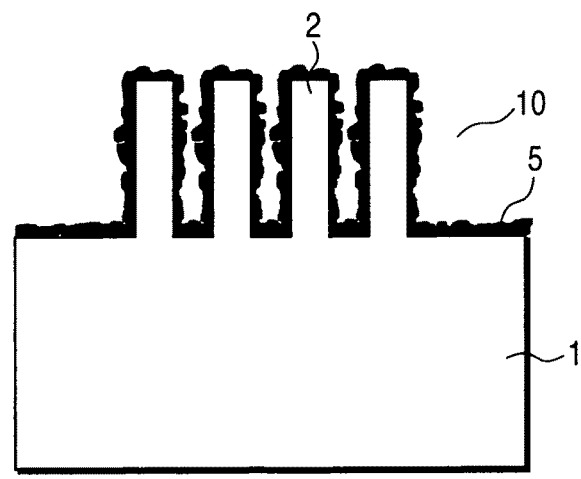
F I G. 3C

NANOCARBON MATERIAL-COMPOSITE SUBSTRATE AND MANUFACTURING METHOD THEREOF

CROSS-REFERENCE TO RELATED APPLICATIONS

This is a Continuation Application of PCT Application No. PCT/JP2009/067061, filed Sep. 30, 2009, which was published under PCT Article 21(2) in Japanese.

This application is based upon and claims the benefit of priority from prior Japanese Patent Application No. 2008-254823, filed Sep. 30, 2008, the entire contents of which are incorporated herein by reference.

BACKGROUND OF THE INVENTION

1. Field of the Invention

The present invention relates to a composite substrate containing a nanocarbon material which is expected to be applicable to a reinforcing material, an electron-emitting element material, an electrode material for batteries, an electromagnetic wave-absorbing material, a catalytic material, an optical material, etc.

2. Description of the Related Art

Since the nanocarbon material has a microstructure of the order of nanometers in size and is constituted by carbon atoms of an $sp^2$ hybridized orbit, the nanocarbon material can exhibit unique characteristics that is superior to those of conventional carbon materials and that are unknown in conventional carbon materials. Therefore, the nanocarbon material is expected to be applicable, as a high-performance next-generation material, to a reinforcing material, an electron-emitting element material, an electrode material of a battery, an electromagnetic wave-absorbing material, a catalytic material, an optical material, etc.

With regard to the method of synthesizing the nanocarbon material such as carbon nanotube, there are known several methods including an arc discharging method, a laser ablation method, a plasma chemical vapor deposition method, a thermochemical vapor deposition method, etc. Among these methods, since the arc discharging method, the laser abrasion method and the plasma chemical vapor deposition method are executed through the utilization of a non-equilibrium reaction, various problems occur, as is generally known. Namely, amorphous components are more likely to be produced, the carbon nanotube yield is low, and the thickness and kinds (configuration) of carbon nanotube to be created are non-uniform.

Meanwhile, JP-A 2002-255519 and JP-A 2002-285334 disclose a thermochemical vapor deposition method for manufacturing carbon nanotube wherein a hydrocarbon gas is thermally decomposed in the presence of a catalyst. The thermochemical vapor deposition method is known to exhibit a relatively high yield because of the utilization of a chemical equilibrium reaction. According to this method, it is possible to obtain carbon fibers which can be grown using, as a core, catalytic particles such as ultra-fine iron or nickel particles. The carbon fibers obtained from this method are formed of a carbon network layer which is grown concentrically or as having a hollow configuration.

This method however is accompanied with problems that it is difficult to control the particle diameter or chemical state of metals to be employed as a catalyst and that it is impossible to synthesize a nanocarbon material which is controlled in configuration and in thickness. Namely, it is impossible to optionally obtain a nanocarbon material having a desired structure demanded in a specific actual use, resulting in that it is impossible to avoid deterioration of yield.

Further, in the case of the conventional nanocarbon materials, it is required, on working the nanocarbon material into electrodes for batteries for example, to refine a reaction product containing carbonaceous impurities other than nanocarbon material such as graphite particles and amorphous carbon in order to selectively extract the nanocarbon material out of the reaction product. Moreover, it is required to scrape off the nanocarbon material that has been grown on a substrate in order to collect a required quantity of carbon nanotube. For these reasons, it has been impossible to manufacture desired parts such as electrodes, etc., at low costs by making use of a large quantity of a nanocarbon material having a desired configuration.

Additionally, although the conventional nanocarbon materials are fibrous in structure each fiber exhibiting crystallinity, the aggregate thereof in gram quantities is a disordered aggregate mass and formed of a powder-like or cluster-like solid having a low density. Even if the nanocarbon material of this kind is turned into a paste or mixed with other kinds of material such as a resin, etc., in order to make it useful as a practical material, it has been difficult to obtain a uniform mixture because of the fact that the aggregate of the nanocarbon materials is a disordered mass having a low density.

On the other hand, a method of synthesis which makes it possible to synthesize a high-purity carbon nanotube at a high yield without requiring refining is disclosed in JP-A 2003-12312. This method is based on a peculiar interface decomposition reaction that can be brought about through a contact between a solid substrate and an organic liquid under large temperature difference. This method is called "a solid/liquid interface contact decomposition method". Followings are rough explanation of this method.

At first, a thin film of a transition metal such as Fe, Co, Ni, etc., is deposited on an electrically conductive silicon substrate. Then, this substrate is exposed to a hydrogen plasma or is heated so as to thermally oxidize the thin transition metal film, thereby enabling the substrate to carry catalytic fine particles distributed at a high density. Thereafter, the resultant substrate is immersed in an organic liquid such as methanol and then heated through the application of an electric current to the substrate. As a result, the substrate and the organic liquid can contact each other under large temperature difference, thereby allowing a peculiar interface decomposition reaction to take place, thus synthesizing carbon nanotube on the surface of catalytic fine particles. According to this method, it is possible to deposit, on the surface of the substrate, a nanocarbon material which is high in density, high in purity and low in manufacturing cost.

Depending on the end-use of the nanocarbon material, there is a situation where the nanocarbon material may preferably be formed at a higher density and with a larger surface area. For example, in the case of an electrode material for batteries, the storage efficiency or power efficiency can be enhanced by increasing the surface area of the nanocarbon material. Further, in the case of a field-emission-type electron-emitting element, the field concentration efficiency can be enhanced by increasing the aspect ratio of a nanocarbon material or of a substrate provided with a nanocarbon material, thereby enabling electrons to emit at a lower voltage. However, when the aspect ratio of a substrate is increased, it is difficult to enable a raw material to reach a deep inner portion of the substrate. As a result, it has been difficult to deposit a uniform nanocarbon material in a structure exhibiting a large aspect ratio. Therefore, no one has succeeded as yet to obtain such a structure that is suited for use in the above-described end-uses, that is formed of highly densified nanocarbon material, and that makes it possible to utilize a large surface area and a high aspect ratio.

The following are explanation of the problems accompanying the field-emission-type electron-emitting element. In the case of an electron display device, one having an array of minute electron-emitting elements, especially field-emission-type electron-emitting elements, which are disposed in a high-vacuum plane cell is regarded as promising. In this field-emission-type electron-emitting element, the following phenomenon is utilized. Namely, as the intensity of the electric field to be applied to a substance is increased, the width of the energy barrier of the surface of substance is gradually narrowed in conformity with the electric field intensity and when the electric field intensity is increased to $10^7$ V/cm or above, the electrons in the substance can break through the energy barrier because of the tunnel effect, to be thereby emitted from the substance. In this case, since the electric field varies in accordance with Poisson's equation, it is possible for cold electrons to effectively be emitted at a relatively low extraction voltage when an electric field concentrating portion is formed in an electron-emitting member, i.e., emitter.

In recent years, the nanocarbon material has been noticed as an emitter material. A carbon nanotube which is the most representative nanocarbon material, is formed of a hollow cylindrical body of Grapheme sheet constituted by regular arrays of carbon atoms, the cylindrical body having an outer diameter of the order of nanometers and a length ranging from 0.5 micrometers to several tens of micrometers, thus representing a minute substance exhibiting a very high aspect ratio. Because of this, an electric field tends to be concentrated at a distal end portion of this carbon nanotube and hence this carbon nanotube is expected to exhibit high electron-emitting capability. Further, since this carbon nanotube is characterized by high chemical and physical stability, the adsorption or reaction of residual gases in vacuum unlikely occurs during the operation thereof. Therefore, this carbon nanotube is characterized in that it is resistive to ion bombardment and also to exothermic damages that may result from the emission of electrons.

If the carbon nanotube is to be utilized as an emitter, there is a known method for forming the emitter, wherein the carbon nanotube is processed to form a paste, which is then coated on the surface of a substrate by means of printing method. For example, JP-A 2003-272517 discloses a method of forming an emitter by means of screen printing method. First of all, cathodes are formed into a pattern of stripe with a predetermined pitch and then a paste containing carbon nanotube is applied by means of screen printing method over the pattern of cathodes at the same pitch as that of the cathode pattern so as to form isolated carbon nanotube-containing regions each having a rectangular or circular configuration. Then, by means of screen printing method, an insulating layer is formed between the carbon nanotube-containing resin regions. The resultant layers are subsequently baked in an air atmosphere, thereby decomposing the resin component in the carbon nanotube-containing paste layers. As a result, the carbon nanotube is exposed, thereby forming electrode-emitting portions. Finally, a grid electrode is formed over the insulating layer to manufacture the emitter.

The paste to be used in the manufacture of the aforementioned emitter is generally prepared by adding a solvent, a dispersing agent, glass frit acting as an adhesive, a filler, etc., to carbon nanotube powder to form a mixture, and then blending the mixture so as to disperse the carbon nanotube powder in the mixture form a uniform distribution of these components. After finishing the blending, the resultant mixture is subjected to filtration to prepare a paste having the carbon nanotube mixed in a vehicle consisting of the solvent and a resin. Then, the resultant paste is thoroughly agitated to enhance the dispersed state of the paste and then subjected to filtration to prepare a carbon nanotube paste. Thereafter, the surface of a substrate is printed with the carbon nanotube paste obtained from the aforementioned process and then subjected to drying and baking treatments, thereby oxidizing and decomposing the vehicle to obtain a carbon nanotube film. Although it is possible to create a carbon nanotube film on the surface of cathodes by making use of the aforementioned method, it is difficult to orientate the carbon nanotube film relative to the surface of the substrate. Further, in the case of the field-emission-type electron-emitting element, it is preferable to form a nanocarbon material at a higher orientation relative to a substrate and to increase the aspect ratio of a nanocarbon material or of a substrate provided with a nanocarbon material, thereby enhancing the electric field concentration efficiency and enabling the emission of electrons at a lower voltage.

BRIEF SUMMARY OF THE INVENTION

Problems to be Solved by the Invention

It is an object of the present invention to provide a nanocarbon material-composite substrate containing a nanocarbon material formed at a higher density and enabling the utilization of a larger surface area and a higher aspect ratio.

It is another object of the present invention to provide a method of manufacturing a nanocarbon material-composite substrate containing a nanocarbon material having a high purity and formed at a low cost, wherein the structure of the nanocarbon material can be desirably and easily controlled.

Means for Solving the Problems

According to one aspect of the present invention, there is provided a nanocarbon material-composite substrate comprising a substrate; a three-dimensional structural pattern formed on the substrate; and a nanocarbon material formed on a surface of the substrate; wherein the nanocarbon material is disposed at least on a sidewall of the three-dimensional structural pattern.

According to another aspect of the present invention, there is provided a method of manufacturing a nanocarbon material-composite substrate, the method comprising forming a three-dimensional structural pattern on a substrate; depositing a catalyst on a surface of the substrate to obtain the substrate carrying the catalyst; immersing and heating the substrate carrying the catalyst in an organic liquid to bring about solid/liquid interface contact decomposition to thereby allow a nanocarbon material to grow on faces of projected portions or grooved portions in the three-dimensional structural pattern.

Effects of the Problems

According to the nanocarbon material-composite substrate of the present invention, since the nanocarbon material can exist at least on the sidewall portion of a three-dimensional structural pattern, it is possible to utilize a large surface area and a high aspect ratio both originating from the three-dimensional structural pattern.

According to the method of manufacturing a nanocarbon material-composite substrate of the present invention, it is possible to easily form a nanocarbon material on the sidewall portion of a three-dimensional structural pattern at a low cost while uniformly controlling the configuration of the nanocarbon material.

BRIEF DESCRIPTION OF THE SEVERAL VIEWS OF THE DRAWING

FIG. 2 shows a perspective view of projected portions or grooved portion of a nanocarbon material-composite substrate according to the present invention;

FIG. 3A is a cross-sectional view illustrating a method of manufacturing a nanocarbon material-composite substrate according to the present invention;

FIG. 3B is a cross-sectional view illustrating a method of manufacturing a nanocarbon material-composite substrate according to the present invention;

FIG. 3C is a cross-sectional view illustrating a method of manufacturing a nanocarbon material-composite substrate according to the present invention;

DETAILED DESCRIPTION OF THE INVENTION

There will now be described embodiments of the present invention with reference to drawings.

The nanocarbon material-composite substrate according to one embodiment of the present invention comprises a substrate having projected portions or grooved portions on its surface, and a nanocarbon material formed on the faces of the projected portions or grooved portions of the substrate.

Figure 1A:
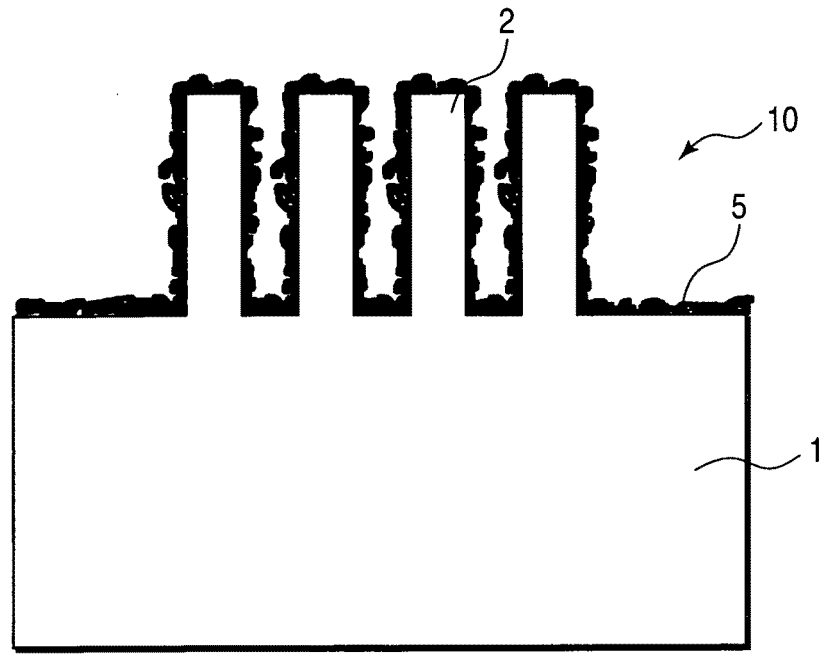
FIG. 1A is a cross-sectional view of a nanocarbon material-composite substrate according to one embodiment of the present invention.

A nanocarbon material-composite substrate according to one embodiment of the present invention will be explained with reference to FIGS. 1A and 1B. The nanocarbon material-composite substrate 10 shown in FIG. 1A is constructed such that projected portions 2 are formed on the surface of the substrate 1 and a nanocarbon material 5 can grow on the surface of the substrate 1 including the top faces and sidewalls of the projected portions 2. In this FIG. 1A, the nanocarbon material 5 is orientated at random. Whereas in the case of the nanocarbon material-composite substrate 10 shown in FIG. 1B, the growth of the nanocarbon material 5 is orientated perpendicular to the surface of the substrate 1 including the top faces and sidewalls of the projected portions 2.

The nanocarbon material 5 can be created as follows. Namely, a catalyst is deposited on the face of the projected portions 2 to obtain the projected portions 2 carrying the catalyst, on which the nanocarbon material 5 is allowed to grow by a solid/liquid interface contact decomposition method. The composite substrates shown in FIGS. 1A and 1B can be produced by controlling the synthesis conditions thereof (for example, the quantity of catalyst to be carried on the surface and synthesis temperature) in the solid/liquid interface contact decomposition method. For example, when the quantity of catalyst to be carried on the surface is decreased as compared with that required to deposit a nanocarbon material which is orientated perpendicular to the surface of the substrate as shown in FIG. 1B, the growth of the nanocarbon material 5 tends to become random showing no orientation as shown in FIG. 1A.

Figure 1B:
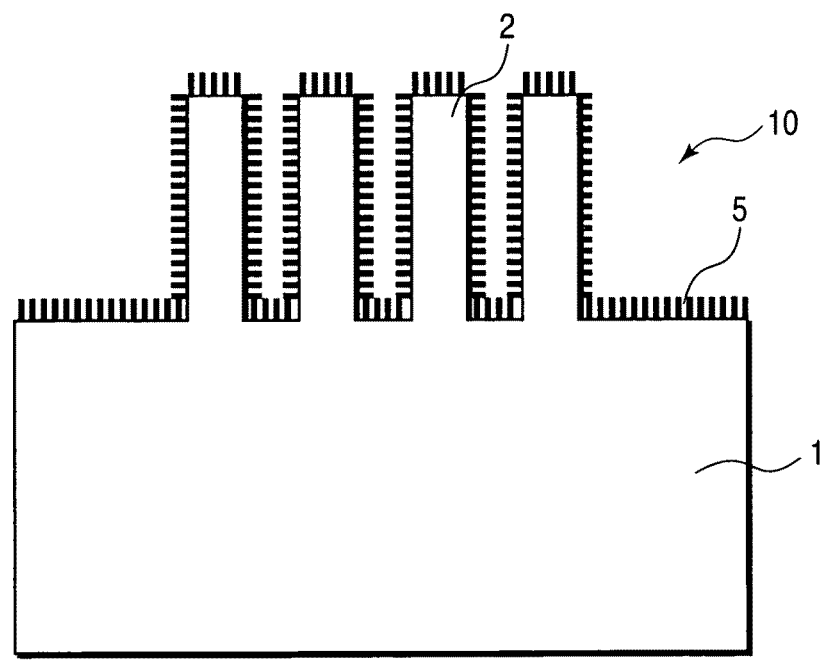
FIG. 1B is a cross-sectional view of a nanocarbon material-composite substrate according to another embodiment of the present invention.

As shown in FIGS. 1A and 1B, since the nanocarbon material 5 is formed at a high density on the surface of the substrate 1 including the top faces and sidewalls of the projected portions 2, it is possible to utilize an increased surface area and a higher aspect ratio. The projected portions 2 may be of any appropriate configuration depending on the end-use thereof, thereby making it possible to achieve various shape effects. When the nanocarbon material-composite substrate 10 of the present invention is employed, it is possible to enhance the characteristics of various practical devices such as electrode materials of battery, an electron-emitting elements, etc.

As for the materials of the substrate 1, it is possible to employ a semiconductor material such as monocrystalline silicon, germanium, gallium arsenide, phosphorus gallium arsenide, gallium nitride, silicon carbide, etc.; glass; ceramics; quartz; etc. With respect to the thickness of the substrate 1, although there is not any particular limitation, it is generally preferable to confine it to 100 to 1500 μm.

With respect to the height of the projected portions 2, it is preferable to make it not less than 1 μm, more preferably not less than 10 μm. As the aspect ratio of the projected portions 2 becomes larger, the surface area of the projected portions 2 increases correspondingly and the shape effects can be correspondingly enhanced. It is preferable to suitably design the aspect ratio of the projected portions 2 in conformity with the end-use of the substrate.

With regard to the material for the nanocarbon material 5, it is possible to employ carbon nanotube, carbon nanofiber, carbon nanohorn, carbon nanofilament, carbon nanowall or carbon nanocoil.

As shown in FIG. 1B, when the nanocarbon material 5 is orientated perpendicular to the face of the substrate 1 including the top faces and sidewalls of the projected portions 2, it is possible to effectively utilize the enhanced surface area and the shape effects, thereby making it possible to improve the characteristics of a device.

As shown in FIG. 2[(a)-(g)], the projected portions 2 or the grooved portions 3 can be shaped into various configurations. The shapes of the projected portions 2 shown in FIG. 2[(a)-(f)] represent column (a), truncated cone (b), square column (c), truncated square pyramid (d), cone (e) and square pyramid (f), respectively. The configuration of the grooved portion 3 shown in FIG. 2(g) is V-shaped in cross-section. Although not shown, the configuration of the grooved portion 3 may be of any other kinds such as U-shaped in cross-section.

As shown in FIG. 2[(a) to 2(d)], when the shape of the projected portions 2 is made into a trapezoidal configuration such as column, truncated cone, polygonal column and truncated pyramid, the projected portions can be efficiently formed and additionally the control of characteristics of various devices can be facilitated.

When the shape of the projected portions 2 is made into the shape of cone or pyramid having a sharp top as shown in FIG. 2[(e) or (f)], it is also possible to efficiently form the projected portions and to easily control the characteristics of various devices.

According to the nanocarbon material-composite substrate representing one embodiment of the present invention, since the projected portions or the grooved portions are formed on the surface of the substrate and furthermore since a nanocarbon material is deposited at a high density on the surfaces of the projected portions or the grooved portions of the substrate, it is possible to utilize a larger surface area and a higher aspect ratio. Accordingly, when the nanocarbon material-composite substrate of the present invention is employed as a structural material, an electron-emitting material, an electric-double-layer capacitor or an electrode material of a battery, fuel cell or ordinary secondary battery, it is possible to obtain excellent practical properties. For example, when this nanocarbon material-composite substrate is applied to a field-emission-type electron-emitting element, the concentration of electric field can be easily brought about at the emitter (nanocarbon material) of cathode made of the nanocarbon material-composite substrate. As a result, the emission of electrons can be facilitated, thus making it possible to drive it at a low voltage.

Especially, in the case of the construction shown in FIG. 1A, since an electric field is concentrated at an end portion of the substrate and hence the electric field can be concentrated at the edge portions of a structure, it is possible to obtain the effects of the concentration of electric field. Further, in the case of the structure shown in FIG. 1B, since the electric field can be concentrated at the orientated nanocarbon material which has been grown and orientated on an edge portion of a working substrate, the electric field can be concentrated at the projected portions of the orientated nanocarbon material, thereby making it possible to obtain higher electric field concentration effects.

Next, a method of manufacturing a nanocarbon material-composite substrate according to another embodiment of the present invention will be explained. The method according to this embodiment is featured in that it comprises a step of forming projected portions or grooved portions on a substrate; a step of depositing a catalyst on the faces of the projected portions or grooved portions; and a step of immersing and heating the substrate having the catalyst carried on the projected portions or grooved portions in an organic liquid to thereby allow a nanocarbon material to grow on the faces of the projected portions or grooved portions through a solid/liquid interface contact decomposition process.

One example of the method according to this embodiment will be explained with reference to FIGS. 3A to 3C.

As shown in FIG. 3A, a substrate 1 is washed and then worked to form projected portions 2 on the surface of the substrate 1. In this case, grooved portions may be formed in place of the projected portions 2. As for the method of forming these projected portions 2 or grooved portions on the surface of the substrate 1, it is possible to employ lithography, dry etching or wet etching. It is also possible in this case to employ machine working using a cutting blade.

A fine pattern having any desired configuration can be obtained by making use of optical lithography or electron beam lithography. In this case, it is possible, through dry etching or wet etching, to form these projected portions 2 or grooved portions having a dimension of the order of micrometers or not less than 10 µm. Furthermore, it is also possible to execute fine working of almost the same level as that of semiconductor devices. Therefore, it is possible, by making use of methods such as trench etching, to create these projected portions 2 or grooved portions with a very fine pattern or pitches, the configuration thereof exhibiting a high aspect ratio.

By making use of mechanical working using a cutting blade, it is possible to form projected portions 2 exhibiting a high aspect ratio which is nearly of the order of millimeters or projected portions 2 having a sharp top.

Then, as shown in FIG. 3B, a catalyst 4 is deposited on the face of projected portions 2 (or grooved portions), thus forming the projected portions 2 carrying the catalyst 4. With respect to the catalyst 4, it is possible to employ cobalt, iron, nickel, palladium or compounds thereof. As for the method of depositing these catalysts to the surface of the substrate 1, it is possible to employ a sputtering method for example. Alternatively, it is also possible to employ a method wherein a predetermined quantity of an aqueous solution of metal salts is coated on the surface of the substrate 1 and then a redundant quantity of water is allowed to evaporate to dry the coated layer, which is then baked in an air flow heated to 400 to 500° C. to bring about the decomposition of the metal salts as well as the oxidation of metals, thereby converting the metal salts into oxides. With respect to the thickness of the catalyst 4 to be deposited, although there is not any particular limitation, it is generally preferable to confine it to 1 to 10 nm.

Thereafter, as shown in FIG. 3C, the substrate 1 carrying the catalyst on the projected portions 2 (or grooved portions) is immersed and heated in an organic liquid, thereby allowing a nanocarbon material 5 to grow on the faces of projected portions 2 (or grooved portions) by way of solid/liquid interface contact decomposition, thus manufacturing a nanocarbon material-composite substrate 1. In this case, since the organic liquid is allowed to permeate into a deep inner portion of the three-dimensional structural pattern that has been created to thereby allow the reaction to proceed even at the solid/liquid interface of this deep inner portion, it is possible to uniformly form the nanocarbon material even in the three-dimensional structural pattern exhibiting a high aspect ratio. Therefore, it is now possible to appropriately manufacture a nanocarbon material-composite substrate having a nanocarbon material deposited at least on the sidewall of the three-dimensional structural pattern.

Figure 4:
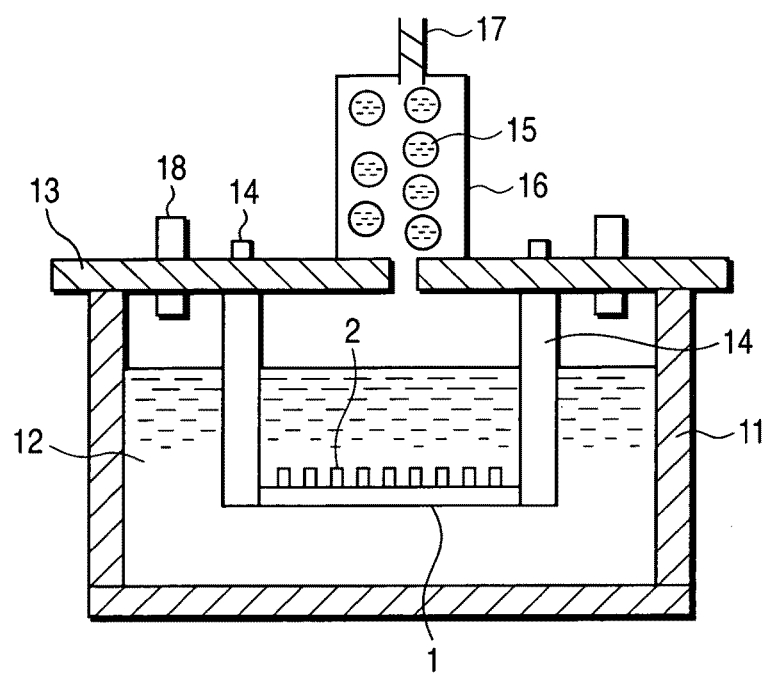
FIG. 4 is a schematic cross-sectional view representing one example of a nanocarbon material-composite substrate-manufacturing apparatus according to the present invention.

FIG. 4 shows one example of the manufacturing apparatus for carrying out the solid/liquid interface contact decomposition method.

An organic liquid 12 is contained in a liquid tank 11. This liquid tank 11 is provided on its circumference with a water cooling means (not shown). The top of the liquid tank 11 is hermetically closed with a cover plate 13. This cover plate 13 is equipped with a pair of electrodes 14 in such a manner that these electrodes 14 can be immersed in the organic liquid 12. A substrate 1 is sustained by lower portions of the pair of electrodes 14 and immersed in the organic liquid 12. Under these conditions, an electric current is passed through the substrate 1 to heat the substrate 1. On the top surface of the cover plate 13, there is disposed a condenser 16 equipped with a water-cooling pipe 15, so that the vapor of the organic liquid that has been evaporated from the liquid tank 11 can cool and condense, thereby allowing the organic liquid to return to the liquid tank 11. On the top surface of the condenser 16, there is disposed a filter 17. Further, the cover plate 13 is equipped with a valve 18 for introducing an inert gas into the liquid tank 11 and into the condenser 16, thereby enabling the purging of the air from these liquid tank 11 and condenser 16.

The solid/liquid interface contact decomposition method can be carried out by making use of the apparatus constructed as described above.

First of all, the substrate 1 having the projected portions 2 and carrying the catalyst 4 on its surface is attached to a lower portion of the pair of electrodes 13. Then, the organic liquid 12 is poured in the liquid tank 11. As for specific examples of the organic liquid 12, it is possible to employ alcohols such as methanol, ethanol, octanol, etc.; or hydrocarbon such as benzene. It is preferable to introduce an inert gas into the liquid tank 11 through the valve 18 to thereby replace residual air existing in the liquid tank 11 by the inert gas. By doing so, it is possible to avoid any dangers such as explosion or combustion resulting from the mixing of an organic gas with air.

Next, an electric current is passed through the pair of electrodes 13 to heat the substrate 1. The heating temperature of the substrate 1 may preferably be confined to the range of 550 to 1000° C. Because of this heating, bubbles of the organic liquid 12 are produced on the surface of the substrate 1. As a result, the surface of the substrate 1 is covered with the bubbles. On this occasion, in order to keep the temperature of organic liquid 12 to not higher the boiling point of the organic liquid 12, the organic liquid 12 is cooled by a water-cooling means disposed on the outer circumference of the liquid tank 11. Incidentally, the organic liquid that has been turned into a gaseous phase is subsequently condensed by the condenser 16, enabling the organic liquid to return to the liquid tank 11. Because of this, the organic liquid would not be wasted.

By controlling the temperature and heating time of the substrate 1 as described above, nanocarbon fiber having a desired configuration can be deposited on the catalyst carried on the surface of projected portions 2 (or grooved portions) of the substrate 1.

Since the raw material is formed of an organic liquid, it is possible, through the employment of the aforementioned solid/liquid interface contact decomposition method, to allow the raw material to penetrate into very narrow portions of the projected portions 2 (or grooved portions), thereby making it possible to bring about a uniform chemical synthesis reaction. For this reason, it is possible to uniformly form a nanocarbon material which is high in purity and in crystallinity on the surface of the substrate 1 having the projected portions 2 (or grooved portions).

When silicon is employed as a material for the substrate 1 and cobalt is employed as a catalyst, silicon can be brought into a stable oxidized state thereof together with cobalt, thereby making it possible to more stably control the state of the nanocarbon material. When cobalt or an oxide thereof is employed as a catalyst and methanol is employed as an organic liquid, it is possible to easily realize the growth of a nanocarbon material which is orientated perpendicular to the surface of the substrate 1 including the top faces and sidewalls of the projected portions 2.

As described above, since a substrate is heated to 550 to 1000° C. in the solid/liquid interface contact decomposition method, it would be naturally conceivable for persons skilled in the art to avoid the application of the method to a substrate having fine protruded/recessed portions on its surface. The reason is that when a substrate having fine projections and depressions on its surface is heated to high temperatures, there is a risk of cracks being generated in the substrate. On the contrary, however, it has been found out, through the researches made by the present inventors, that even if the solid/liquid interface contact decomposition method is applied to a substrate having fine projections and depressions on its surface, it is possible to avoid the generation of cracks in the substrate and that a nanocarbon material which is high in purity and in crystallinity can be easily formed on the surface of the substrate having projected portions or grooved portions at low costs while making it possible to control the uniformity and configuration of projected portions.

EXAMPLE

Followings are explanation of specific examples of the present invention.

Mechanical cutting work or chemical etching was applied to the surface of an n-type monocrystalline silicon (100) substrate of low electrical resistance, thereby forming projected portions of square columns or square pyramids on the surface of the substrate.

Then, by means of sputtering, cobalt employed as a catalyst was deposited to a thickness of 6 nm on the surface of the substrate and the deposited layer was subjected to heat treatment for 10 minutes in air atmosphere at a temperature of 900° C.

The resultant substrate was immersed in methanol and an electric current was passed through electrodes to the substrate so as to heat the substrate for three minutes at 600° C. at first and then to heat the substrate for 6 minutes at 900° C. As a result, a solid/liquid interface contact decomposition reaction using carbon atoms in the methanol as a raw material was produced in the vicinity of the substrate, thereby forming carbon nanotube on the surface of the substrate. As a result, it was possible to orient carbon nanotube growth perpendicular to the surface of the substrate 1 including the top faces and sidewalls of the projected portions 2. The length of the carbon nanotube thus grown was about 2 to 3 µm.

Figure 5A:
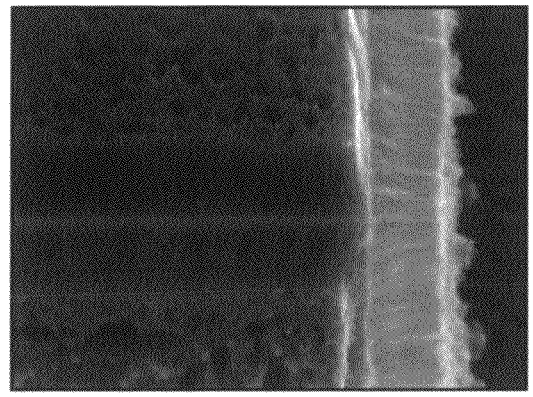
FIG. 5A shows a scanning electron microscopic image of the nanocarbon material-composite substrate manufactured in one example.
Figure 5B:
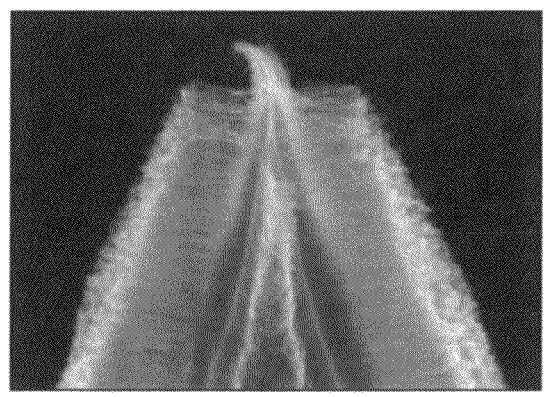
FIG. 5B shows a scanning electron microscopic image of the nanocarbon material-composite substrate manufactured in another example.
Figure 6A:
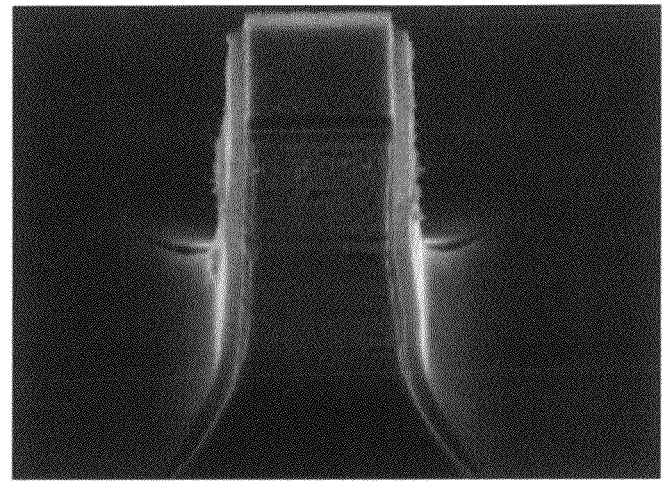
FIG. 6A shows a scanning electron microscopic image of the nanocarbon material-composite substrate manufactured in another example.
Figure 6B:
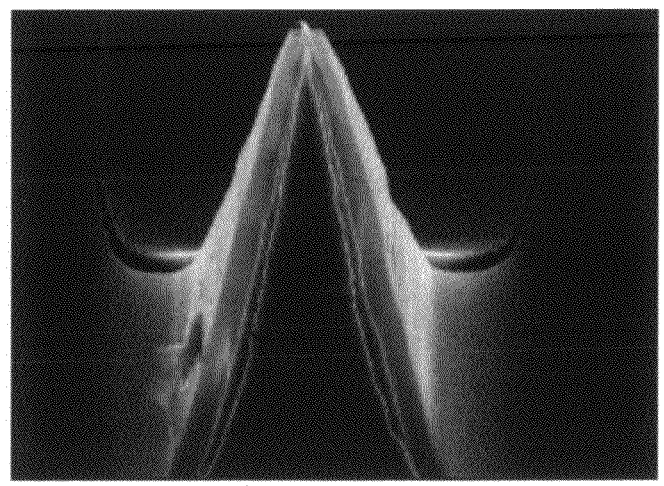
FIG. 6B shows a scanning electron microscopic image of the nanocarbon material-composite substrate manufactured in another example.

FIGS. 5A and 5B show respectively a scanning electron microscopic image of the nanocarbon material-composite substrate containing the carbon nanotube grown on the faces of the projected portions of the substrate. FIGS. 5A and 6A show one example where the projected portions are respectively formed of a square column and FIGS. 5B and 6B show another example where the projected portions are respectively formed of a square pyramid. FIGS. 5A and 5B illustrate respectively an enlarged view of the tip end portion of each of these projected portions and FIGS. 6A and 6B illustrate respectively the general view of each of these projected portions. In both examples, it was confirmed that carbon nanotube was grown at a high density and perpendicularly to the faces of projected portions and that the nanocarbon material was deposited on the sidewalls of the three-dimensional structure.

Then, the nanocarbon material-composite substrate obtained as described above was employed as a cathode of a field-emission-type electron-emitting element and an anode was disposed to oppose to the cathode with a gap of 1 mm being interposed therebetween. Under these conditions, the electric field electron-emitting characteristics thereof was measured. As a result, it was possible to confirm that the emission of electrons could be realized at a low field intensity of as low as 1 V/µm or less.

The nanocarbon material-composite substrate according to the present invention is expected to be useful as a substrate for a reinforcing material, an electrode material for batteries, an electromagnetic wave-absorbing material, a catalytic material, an optical material, an electron emission element material, etc.

Especially, the nanocarbon material-composite substrate according to the present invention is expected to be useful as a field-emission-type electron-emitting element which is capable of emitting electrons by the effects of strong electric fields. More specifically, the nanocarbon material-composite substrate is expected to be useful as an electron-emitting element for an optical printer, an electron microscope, an electron-producing source such as an electron beam exposure apparatus, an electron gun, a face electron source of a field emitter array constituting a plane display, an illumination lamp, etc.

Especially when the nanocarbon material-composite substrate is used as an electron-emitting element of an illumination lamp, the nanocarbon material-composite substrate is expected to be applicable to various kinds of illuminations including: (1) applications for displays such as a liquid crystal backlight, a projector light source and an LED display light source; (2) applications for signal devices such as a traffic signal lamp, an industrial/operational rotating lamp, a signal lamp, an emergency light and a guiding lamp; (3) applications for sensing devices such as an infrared sensor light source, an industrial light sensor light source and an optical communication light source; (4) applications for medical image processing devices such as a medical light source (fundus camera, slit lamp), a medical light source (endoscope) and an image processing light source; (5) applications for photochemical reaction devices such as curing/drying/adhesion light sources, washing/surface reform light sources and water sterilization/air sterilization light sources; (6) applications for automobiles such as a head lamp, a rear combination lamp and an interior lamp; and (7) applications for general illumination such as office illumination, store illumination, plant illumination, set light/stage light, outdoor illumination, home illumination, display light (pachinko game machine, automatic vending machine, refrigerating/chilled showcase), apparatus/furniture built-in illumination; etc.

Incidentally, it should not be construed that the application of the nanocarbon material-composite substrate of the present invention is limited to the aforementioned end-uses.

Explanation of Symbols

1—Substrate, 2—Protrusions, 3—Grooves, 4—Catalyst, 5—Nanocarbon material, 10—Nanocarbon material-composite substrate, 11—Liquid tank, 12—Organic liquid, 14—Electrodes, 15—Water-cooling pipe, 16—Condenser, 17—Filter, 18—Valve.

What is claimed is:

1. A nanocarbon material-composite substrate comprising:
a silicon substrate;
a three-dimensional structural pattern formed on the substrate; and
a nanocarbon material formed on the surface of the substrate,
the three-dimensional structural pattern having a plurality of projected portions each isolated from others,
the projected portions carrying a catalyst formed of cobalt or a cobalt oxide thereon,
the nanocarbon material being present at least on sidewalls of the projected portions with the catalyst intervened between the sidewalls of the projected portions and the nanocarbon material,
the nanocarbon material formed on the surface of the substrate being oriented perpendicular to the surface of the substrate, and
the nanocarbon material disposed on the sidewall of the three-dimensional structural pattern being oriented perpendicular to the sidewall of the three-dimensional structural pattern.

2. The nanocarbon material-composite substrate according to claim 1, wherein each of the projected portions has a height of not lower than 10 μm.

3. The nanocarbon material-composite substrate according to claim 2, wherein the projected portions are respectively of a shape selected from the group consisting of column, truncated cone, polygonal column, truncated polygonal pyramid, cone and pyramid.

4. The nanocarbon material-composite substrate according to claim 1, wherein the nanocarbon material contains at least one kind of material selected from the group consisting of carbon nanotube, carbon nanofiber, carbon nanohorn, carbon nanofilament, carbon nanowall and carbon nanocoil.

* * * * *